Jan. 21, 1964
M. J. BUZAWA
3,118,964
MICROSCOPE OBJECTIVE
Filed April 26, 1962
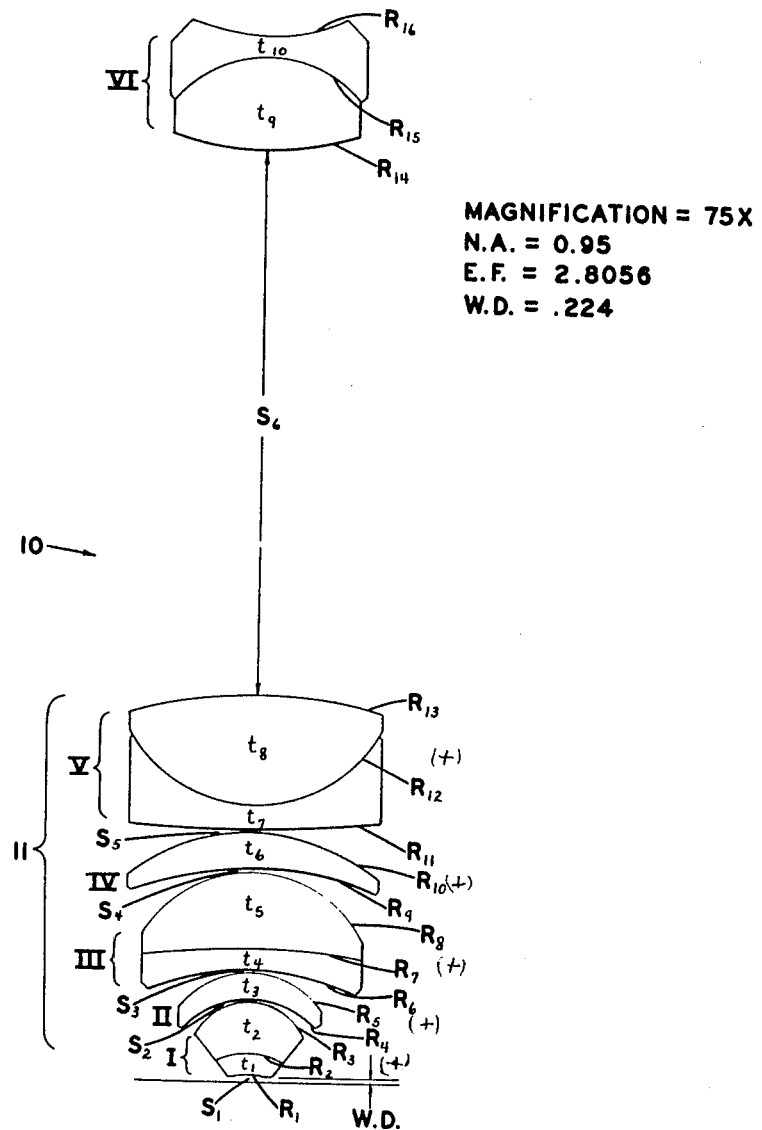
MAGNIFICATION = 75X
N.A. = 0.95
E.F. = 2.8056
W.D. = .224
*INVENTOR.*
MICHAEL J. BUZAWA
BY Frank C. Parker
ATTORNEY

United States Patent Office 3,118,964
Patented Jan. 21, 1964

---

3,118,964
MICROSCOPE OBJECTIVE
Michael J. Buzawa, Rochester, N.Y., assignor to Bausch & Lomb Incorporated, Rochester, N.Y., a corporation of New York
Filed Apr. 26, 1962, Ser. No. 190,371
4 Claims. (Cl. 88—57)

This invention relates to a microscope objective of relatively high power and numerical aperture which operates dry and more particularly it relates to an improved optical system therefor.

It is an object of this invention to provide a novel optical system for a microscope objective of the dry type having a relatively high magnification of substantially 75× and numerical aperture of substantially 0.95, said system further providing a well corrected condition of chromatic and monochromatic aberrations together with an unusually flat field and a diffraction limited performance.

Further objects and advantages will be apparent in the form and arrangement of the parts of said optical system and in the detailed structure thereof as described in the specification herebelow and shown in the accompanying drawing, wherein the single figure shows a preferred form of the present invention.

As shown in the drawing, a preferred form of optical system for a microscope objective constructed in accordance with my invention is generally designated by the numeral 10, said system having a magnification rating of 75× and a numerical aperture of 0.95.

According to this invention, the optical system 10 includes a front lens group 11 comprising a front lens member I which is composed of a front meniscus lens element located nearest to the object end of said system, and a contiguous rear meniscus lens element which may be cemented to the front element. Said objective further comprises a singlet second lens member II of meniscus form which is concave toward the object side of the optical system 10.

Further comprised in said front lens group 11 is a third lens member III of generally meniscus form which is composed of two convex-concave lens elements which are in contact with each other and both of which are concave toward the object side of the optical system. Rearwardly of said third lens member is arranged a fourth lens member IV of meniscus form and singlet construction which is also concave toward the object side, and spaced rearwardly thereof is a double convex lens member V composed of a front convex-concavo lens element and a rear double convex lens element in contact therewith.

Separated by a large air space rearwardly of the front lens group 11 is an optically aligned second lens group consisting of a single lens member VI which is composed of a front double convex lens element in contact with a rear double concave element.

All of the lens members in the front lens group 11 have positive power and the rear lens group has weak negative power as specified hereinafter, the constructional parameters of the lens member VI being so conceived as to reduce astigmatism and lateral color originating in the front group 11 to a near optimum condition. Additionally, lens member VI introduces substantial over-correction of field curvature which acts together with the concave front lens surface $R_1$ in producing an excellent flat field.

The successive refractive surfaces of the lens members I to VI named in order from the front or object side are designated $R_1$ to $R_{16}$, the successive thicknesses of the lens elements are represented by $t_1$ to $t_{10}$, the surrounding air spaces are designated $S_1$ to $S_6$, and the refractive index and Abbe number are represented by the symbols $n_D$ and $\nu$. Interfaces $R_2$ and $R_{12}$ and the refractive index differences between the glasses of the contiguous lens elements lying at either side of these surfaces are utilized for controlling the lower rim rays for extra axial object points, and the upper rim rays are correspondingly controlled by the interfaces $R_{12}$ and $R_{15}$ and the index difference found in the lens elements contiguous to these surfaces.

For the attainment of the objects of this invention, the focal lengths $F_1$ to $F_6$ related respectively to the successive lens members I to VI have been discovered to be effective as stated in the range of values given in the table herebelow, wherein the letter F or letters E.F. represent the equivalent focus of the entire optical system 10.

$$6.0F < F_1 < 6.5F$$
$$11.8F < F_2 < 12.8F$$
$$7.5F < F_3 < 8.0F$$
$$9.5F < F_4 < 10.5F$$
$$11.3F < F_5 < 12.3F$$
$$17.0F < -F_6 < 20.0F$$

For the same reason, the values for the radii $R_1$ to $R_{16}$ of the lens surfaces, the axial thicknesses $t_1$ to $t_{10}$ of the successive lens elements, and the axial air spaces $S_1$ to $S_6$ around said elements should lie within the range of numerical values specified in the table given herebelow:

| | |
|---|---|
| $.37F < -R_1 < .45F$ | $.25F < t_1 < .31F$ |
| $.78F < -R_2 < .95F$ | $.55F < t_2 < .67F$ |
| $.70F < -R_3 < .85F$ | $.32F < t_3 < .38F$ |
| $1.13F < -R_4 < 1.37F$ | $.22F < t_4 < .28F$ |
| $1.07F < -R_5 < 1.31F$ | $.88F < t_5 < 1.08F$ |
| $3.15F < -R_6 < 3.85F$ | $.47F < t_6 < .58F$ |
| $10.24F < -R_7 < 12.52F$ | $.25F < t_7 < .31F$ |
| $1.54F < -R_8 < 1.88F$ | $1.31F < t_8 < 1.61F$ |
| $4.10F < -R_9 < 5.00F$ | $1.10F < t_9 < 1.35F$ |
| $2.49F < -R_{10} < 3.00F$ | $.238F < t_{10} < .290F$ |
| $31.5F < R_{11} < 38.5F$ | $.072F < S_1 < .088F$ |
| $1.66F < R_{12} < 2.00F$ | $.009F < S_2 < .012F$ |
| $5.57F < -R_{13} < 6.80F$ | $.015F < S_3 < .020F$ |
| $3.53F < R_{14} < 4.31F$ | $.029F < S_4 < .035F$ |
| $1.45F < -R_{15} < 1.77F$ | $.064F < S_5 < .078F$ |
| $2.37F < R_{16} < 2.89F$ | $6.20F < S_6 < 7.70F$ |

The rear lens element of lens member III is formed of fluorite material and the aforementioned refractive index and Abbe number of the materials of the respective lens members should be as stated in the table herebelow:

| Lens Member | Difference d between value of $n_D$ of lens elements | Difference $d_1$ in $\nu$ values between lens elements |
|---|---|---|
| I | $d > .055$ with larger value in rear element. | $d_1 > 9.0$ with larger value in rear element. |
| II | $1.617 < n_D < 1.623$. | $55.0 < \nu < 65.0$. |
| III | $d > .180$ with larger value in front element. | $d_1 > 58.0$ with larger value in rear element. |
| IV | $1.617 < n_D < 1.623$. | $55.0 < \nu < 65.0$. |
| V | $d > .060$ with larger value in front element. | $d_1 > 28.0$ with larger value in rear element. |
| VI | $d > .013$ with larger value in rear element. | $d_1 > 15.0$ with larger value in rear element. |

Stated in another manner, the above parameters may be specified in the ranges of numerical values given in the table herebelow:

$555 < n_D$ (I front) $< 1.565$    $40.0 < \nu$ (I front) $< 50.0$
$1.615 < n_D$ (I rear) $< 1.622$    $55.0 < \nu$ (I rear) $< 65.0$
$1.617 < n_D$ (II) $< 1.623$    $55.0 < \nu$ (II) $< 65.0$
$1.615 < n_D$ (III front) $< 1.622$    $55.0 < \nu$ (III front) $< 65.0$
$1.430 < n_D$ (III rear) $< 1.436$    $90.0 < \nu$ (III rear) $< 100.0$
$1.617 < n_D$ (IV) $< 1.623$    $55.0 < \nu$ (IV) $< 65.0$
$1.685 < n_D$ (V front) $< 1.695$    $25.0 < \nu$ (V front) $< 35.0$
$1.617 < n_D$ (V rear) $< 1.623$    $55.0 < \nu$ (V rear) $< 65.0$
$1.600 < n_D$ (VI front) $< 1.610$    $40.0 < \nu$ (VI front) $< 47.0$
$1.617 < n_D$ (VI rear) $< 1.623$    $55.0 < \nu$ (VI rear) $< 65.0$ The parameters $R_1$ to $R_{16}$, $t_1$ to $t_{10}$, and $S_1$ to $S_6$ for one successful form of the present invention may be specified in the following table of values, the minus sign (—) indicating a lens surface which is convex toward the image side of the optical system:

$R_1 = -.412F$    $t_1 = .278F$
$R_2 = -.877F$    $t_2 = .613F$
$R_3 = -.785F$    $t_3 = .350F$
$R_4 = -1.25F$    $t_4 = .246F$
$R_5 = -1.19F$    $t_5 = .982F$
$R_6 = -3.5F$    $t_6 = .525F$
$R_7 = -11.38F$    $t_7 = .282F$
$R_8 = -1.71F$    $t_8 = 1.465F$
$R_9 = -4.55F$    $t_9 = 1.228F$
$R_{10} = -2.76F$    $t_{10} = .264F$
$R_{11} = 35.00F$    $S_1 = .080F$
$R_{12} = 1.84F$    $S_2 = .0107F$
$R_{13} = -6.19F$    $S_3 = .0178F$
$R_{14} = 3.92F$    $S_4 = .0322F$
$R_{15} = -1.615F$    $S_5 = .0715F$
$R_{16} = 2.62F$    $S_6 = 6.95F$

The corresponding focal lengths of the respective lens members I to IV are substantially according to the mathematical statements herebelow:

$F_1 = 6.16F$    $F_4 = 9.96F$
$F_2 = 12.25F$    $F_5 = 11.79F$
$F_3 = 7.72F$    $F_6 = -17.73F$

Specific numerical values of the parameters related to the above-mentioned successful form of this invention are given in the chart herebelow:

Magnification = 75.0×    E.F. = 2.8056    N.A. = 0.95

| Lens | Radii | Thickness | Spaces | $n_D$ | $\nu$ |
|---|---|---|---|---|---|
| I | $R_1 = -1.5560$ | $t_1 = 0.78$ | $S_1 = .224$ | 1.620 | 60.3 |
|   | $R_2 = -2.4660$ | $t_2 = 1.72$ |  | 1.605 | 43.6 |
|   | $R_3 = -2.2080$ |  | $S_2 = 0.3$ |  |  |
| II | $R_4 = -3.4994$ | $t_3 = 0.98$ |  | 1.620 | 60.3 |
|    | $R_5 = -3.3300$ |  | $S_3 = .05$ |  |  |
| III | $R_6 = -9.8175$ | $t_4 = 0.69$ |  | 1.689 | 30.9 |
|     | $R_7 = -31.915$ | $t_5 = 2.75$ |  | 1.620 | 60.3 |
|     | $R_8 = -4.7863$ |  | $S_4 = .09$ |  |  |
| IV | $R_9 = -12.474$ | $t_6 = 1.47$ |  | 1.4338 | 95.1 |
|    | $R_{10} = -7.5858$ |  | $S_5 = .20$ |  |  |
| V | $R_{11} = 98.175$ | $t_7 = 0.79$ |  | 1.617 | 36.6 |
|   | $R_{12} = 5.2944$ | $t_8 = 4.12$ |  | 1.620 | 60.3 |
|   | $R_{13} = -17.378$ |  | $S_6 = 19.63$ |  |  |
| VI | $R_{14} = 10.965$ | $t_9 = 3.44$ |  | 1.617 | 55.1 |
|    | $R_{15} = -4.5290$ | $t_{10} = 0.74$ |  | 1.559 | 45.5 |
|    | $R_{16} = 7.3486$ |  |  |  |  | wherein E.F. is an abbreviation meaning "equivalent focus" and N.A. is an abbreviation meaning "numerical aperture."

Although only one form of the present invention has been shown and described in detail, other forms are possible and changes may be made in the details of construction without departing from the spirit of the invention as defined in the appended claims.

I claim:

1. An optical system for a dry type of microscope objective having a magnification of 75×, a numerical aperture of 0.95 and a flat field, said system being well corrected for chromatic and monochromatic image aberrations and further having a performance which is diffraction limited, said system comprising a succession of optically aligned lens members which are a first, second, third and fourth meniscus lens member, all of which are air spaced from each other and are concave toward the object side of the system, the first and third members being of compound construction with their refractive interfaces being concave toward the object side, a compound fifth lens member air spaced rearwardly of said fourth member and comprising a front meniscus element which is convex toward the object side and a rear double convex element, the above-recited lens members comprising a front lens group, and a compound sixth lens member air spaced rearwardly from said front lens group and comprising a front double convex element and a rear double concave element, the focal lengths $F_1$ to $F_6$ of successive lens members I to VI being given in terms of the equivalent focus F of said system in order from front to rear in the table of mathematical expressions herebelow:

$6.0F < F_1 < 6.5F$
$11.8F < F_2 < 12.8F$
$7.5F < F_3 < 8.0F$
$9.5F < F_4 < 10.5F$
$11.3F < F_5 < 12.3F$
$17.0F < -F_6 < 20.0F$ the successive axial spaces $S_1$ to $S_6$ between the lens members, and the successive thicknesses of the lens members and their constituent elements being given in the table of inequalities as follows:

$.072F < S_1 < .088F$
$.009F < S_2 < .012F$
$.015F < S_3 < .020F$
$.029F < S_4 < .035F$
$.064F < S_5 < .078F$
$6.2F < S_6 < 7.7F$
$.25F < t_1 < .31F$
$.55F < t_2 < .67F$
$.32F < t_3 < .38F$
$.22F < t_4 < .28F$
$.88F < t_5 < 1.08F$
$.47F < t_6 < .58F$
$.25F < t_7 < .31F$
$1.31F < t_8 < 1.61F$
$1.10F < t_9 < 1.35F$
$.238F < t_{10} < .290F$ the rear element of the third lens member being formed of fluorite, and the refractive index values $n_D$ and Abbe number values being given in the mathematical statements herebelow:

| Lens Member | Difference $d$ between value of $n_D$ of lens elements | Difference $d_1$ in $\nu$ values between lens elements |
|---|---|---|
| I | $d > .055$ with larger value in rear element. | $d_1 > 9.0$ with larger value in rear element. |
| III | $d > .180$ with the larger value in the front element. | $d_1 > 58.0$ with the larger value in the rear element. |
| V | $d > .060$ with the larger value in the front element. | $d_1 > 28.0$ with the larger value in the rear element. |
| VI | $d > .013$ with the larger value in the rear element. | $d_1 > 15.0$ with the larger value in the rear element. |

Lens Member II } $1.617 < n_D < 1.623$    $55.0 < \nu < 65.0$
Lens Member IV

2. An optical system for a dry type of microscope objective having a magnification of 75.0×, a numerical aperture of 0.95, a flat field, and having a diffraction limited performance.

said system comprising a plurality of air spaced members in optical alignment with each other which are,
a first, second, third and fourth meniscus lens member which are all concave toward the object side of said system, the first and third members being compound and having their interfaces concave toward said object side,
a compound fifth lens member spaced rearwardly from the fourth member and comprising a front meniscus element which is convex to said object side, and a rear double convex element in contact therewith, and
a compound sixth lens member spaced rearwardly of said fifth member and comprising a front double convex element and a rear double concave element in contact therewith,
the constructional data having values as set forth in the table of mathematical expressions herebelow, wherein F represents the equivalent focus of said system, $R_1$ to $R_{16}$ represent the radii of the lens surfaces, $t_1$ to $t_{10}$ designate the axial lens thicknesses, $S_1$ to $S_6$ designate the air spaces between said members, and wherein the negative sign designates radii which are concave toward the object.

```
.37F<−R₁<.45F          .25F<t₁<.31F
.78F<−R₂<.95F          .55F<t₂<.67F
.70F<−R₃<.85F          .32F<t₃<.38F
1.13F<−R₄<1.37F        .22F<t₄<.28F
1.07F<−R₅<1.31F        .88F<t₅<1.08F
3.15F<−R₆<3.85F        .47F<t₆<.58F
10.24F<−R₇<12.52F      .25F<t₇<.31F
1.54F<−R₈<1.88F        1.31F<t₈<1.61F
4.10F<−R₉<5.00F        1.10F<t₉<1.35F
2.49F<−R₁₀<3.00F       .23SF<t₁₀<.290F
31.5F<R₁₁<38.5F        .072F<S₁<.088F
1.66F<R₁₂<2.00F        .009F<S₂<.012F
5.57F<−R₁₃<6.80F       .015F<S₃<.020F
3.53F<R₁₄<4.31F        .029F<S₄<.035F
1.45F<−R₁₅<1.77F       .064F<S₅<.078F
2.37F<R₁₆<2.89F        6.20F<S₆<7.70F
``` the aforesaid front and rear elements of said compound lens members and the singlet members having numerical values for refractive index $n_D$ and $\mu$ Abbe number as stated in the tables herebelow:

```
1.555<n_D (I front)<1.565      40.0<ν (I front)<50.0
1.615<n_D (I rear)<1.622       55.0<ν (I rear)<65.0
1.617<n_D (II)<1.623           55.0<ν (II)<65.0
1.615<n_D (III front)<1.622    55.0<ν (III front)<65.0
1.430<n_D (III rear)<1.436     90.0<ν (III rear)<100.0
1.617<n_D (IV)<1.623           55.0<ν (IV)<65.0
1.685<n_D (V front)<1.695      25.0<ν (V front)<35.0
1.617<n_D (V rear)<1.623       55.0<ν (V rear)<65.0
1.600<n_D (VI front)<1.610     40.0<ν (VI front)<47.0
1.617<n_D (VI rear)<1.623      55.0<ν (VI rear)<65.0
```

3. An optical system for a dry type of microscope objective having a magnification of 75.0×, a numerical aperture of 0.95, a flat field, and having a diffraction limited performance.

said system comprising a plurality of air spaced members in optical alignment with each other which are,
a first, second, third and fourth meniscus lens member which are all concave toward the object side of said system, the first and third members being compound and having their interfaces concave toward said object side,
a compound fifth lens member spaced rearwardly from the fourth member and comprising a front meniscus element which is convex to said object side, and a rear double convex element in contact therewith, and
a compound sixth lens member spaced rearwardly of said fifth member and comprising a front double convex element and a rear double concave element in contact therewith,
the constructional data having values as set forth in the table of mathematical expressions herebelow wherein F represents the equivalent focus of said system, $R_1$ to $R_{16}$ represent the radii of the lens surfaces, $t_1$ to $t_{10}$ designate the axial lens thicknesses, $S_1$ to $S_6$ designate the air spaces between said members, and wherein the negative sign designates radii which are concave toward the object,

```
R₁=−.412F       t₁=.278F
R₂=−.877F       t₂=.613F
R₃=−.785F       t₃=.350F
R₄=−1.25F       t₄=.246F
R₅=−1.19F       t₅=.982F
R₆=−3.5F        t₆=.525F
R₇=−11.38F      t₇=.282F
R₈=−1.71F       t₈=1.465F
R₉=−4.55F       t₉=1.228F
R₁₀=−2.76F      t₁₀=.264F
R₁₁=35.00F      S₁=.080F
R₁₂=1.84F       S₂=.0107F
R₁₃=−6.19F      S₃=.0178F
R₁₄=3.92F       S₄=.0322F
R₁₅=−1.615F     S₅=.0715F
R₁₆=2.62F       S₆=6.95F
``` the numerical values of the refractive index $n_D$ and Abbe number $m\mu$ of said front and rear elements of the compound members, and the singlet members being as stated in the table herebelow:

```
1.555<n_D (I front)<1.565      40.0<ν (I front)<50.0
1.615<n_D (I rear)<1.622       55.0<ν (I rear)<65.0
1.617<n_D (II)<1.625           55.0<ν (II)<65.0
1.615<n_D (III front)<1.622    55.0<ν (III front)<65.0
1.430<n_D (III rear)<1.436     90.0<ν (III rear)<100.0
1.617<n_D (IV)<1.623           55.0<ν (IV)<65.0
1.685<n_D (V front)<1.695      25.0<ν (V front)<35.0
1.617<n_D (V rear)<1.623       55.0<ν (V rear)<65.0
1.600<n_D (VI front)<1.610     40.0<ν (VI front)<47.0
1.617<n_D (VI rear)<1.623      55.0<ν (VI rear)<65.0
```

4. An optical system for a dry type of microscope objective having a magnification of 75×, a numerical aperture of 0.95, a flat field and having a performance which is diffraction limited, said system comprising a succession of optically aligned lens members which are,
the constructional data for said objective being given in the table herebelow wherein $R_1$ to $R_{16}$ represent the radii of the lens surfaces, $t_1$ to $t_{10}$ denote the axial lens thickness, $S_1$ to $S_6$ represent the lens spacings, and $n_D$ and $\mu$ represent the refractive index and Abbe number respectively,

[Magnification=75.0×   E.F.=2.8056   N.A.=0.95]

| Lens | Radii | Thickness | Spaces | $n_D$ | $\nu$ |
|---|---|---|---|---|---|
| | | | $S_1$=.224 | | |
| I | $R_1$=−1.5560 | $t_1$=0.78 | | 1.620 | 60.3 |
| | $R_2$=−2.4060 | $t_2$=1.72 | | 1.605 | 43.6 |
| | $R_3$=−2.2080 | | | | |
| | | | $S_2$=.03 | | |
| II | $R_4$=−3.4994 | $t_3$=0.98 | | 1.620 | 60.3 |
| | $R_5$=−3.3300 | | | | |
| | | | $S_3$=.05 | | |
| III | $R_6$=−9.8175 | $t_4$=0.69 | | 1.689 | 30.9 |
| | $R_7$=−31.915 | $t_5$=2.75 | | 1.620 | 60.3 |
| | $R_8$=−4.7863 | | | | |
| | | | $S_4$=.09 | | |
| IV | $R_9$=−12.474 | $t_6$=1.47 | | 1.4338 | 95.1 |
| | $R_{10}$=−7.5858 | | | | |
| | | | $S_5$=.20 | | |
| | $R_{11}$=98.175 | | | | |
| V | $R_{12}$=5.2944 | $t_7$=0.79 | | 1.617 | 36.6 |
| | $R_{13}$=−17.378 | $t_8$=4.12 | | 1.620 | 60.3 |
| | | | $S_6$=19.63 | | |
| | $R_{14}$=10.965 | | | | |
| VI | $R_{15}$=−4.5290 | $t_9$=3.44 | | 1.617 | 55.1 |
| | $R_{16}$=7.3486 | $t_{10}$=0.74 | | 1.559 | 45.5 | wherein E.F. is an abbreviation meaning "equivalent focus" and N.A. is an abbreviation meaning "numerical aperture."

No references cited.

UNITED STATES PATENT OFFICE
CERTIFICATE OF CORRECTION

Patent No. 3,118,964                            January 21, 1964

Michael J. Buzawa

It is hereby certified that error appears in the above numbered patent requiring correction and that the said Letters Patent should read as corrected below.

Column 1, line 16, before "numerical" insert -- a --; column 3, line 4, for "555" read -- 1.555 --; same column 3, in the table, under the heading "Spaces", second item, for "$S_2=0.3$" read -- $S_2=.03$ --; column 6, line 41, for "thickness" read -- thicknesses --.

Signed and sealed this 16th day of June 1964.

SEAL)
Attest:

ERNEST W. SWIDER                                         EDWARD J. BRENNER
Attesting Officer                                             Commissioner of Patents